June 30, 1925.  1,544,056
D. B. DIMICK
APPARATUS FOR MOLDING PIPE
Filed Sept. 16, 1922  7 Sheets-Sheet 3
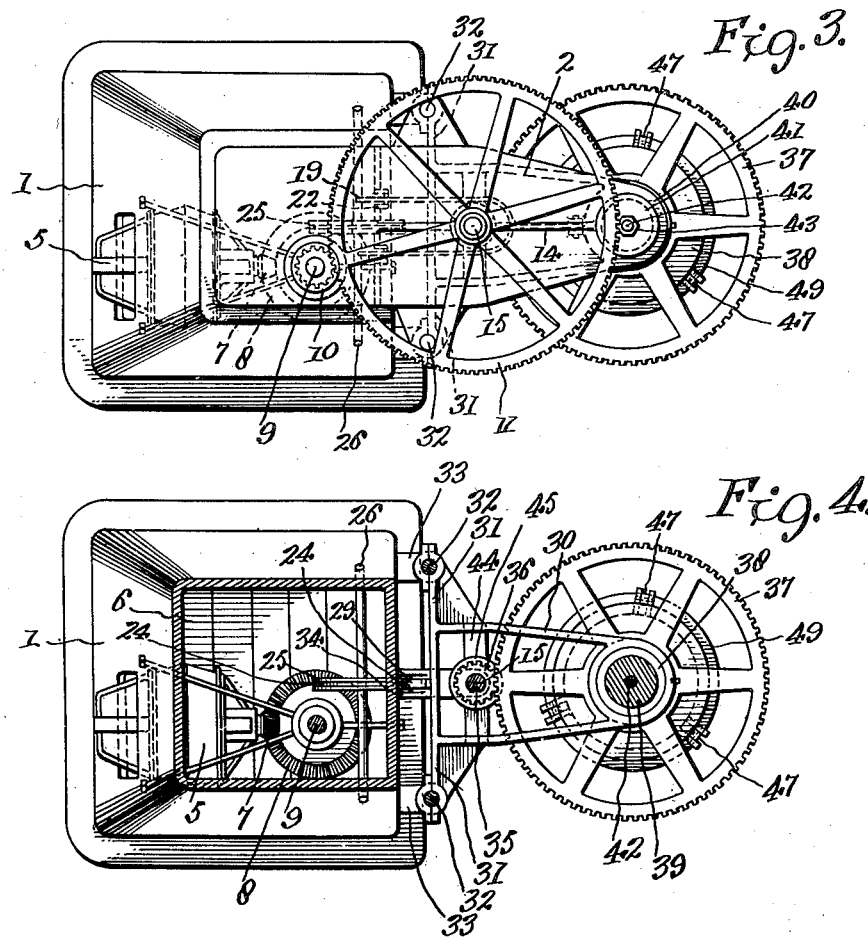
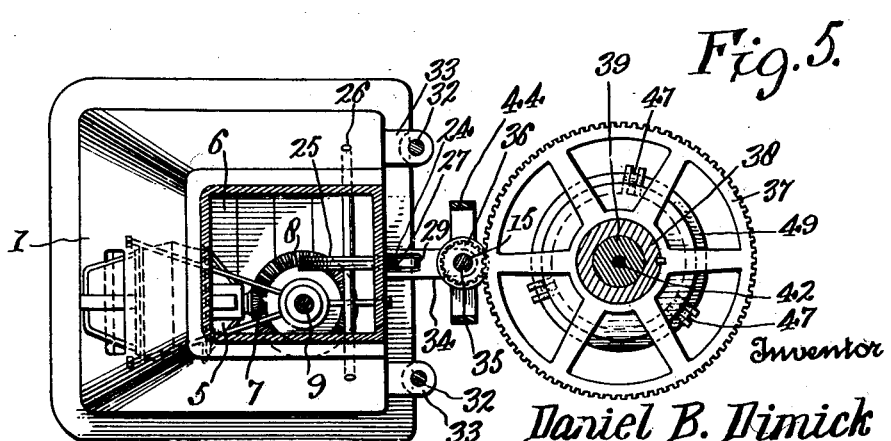

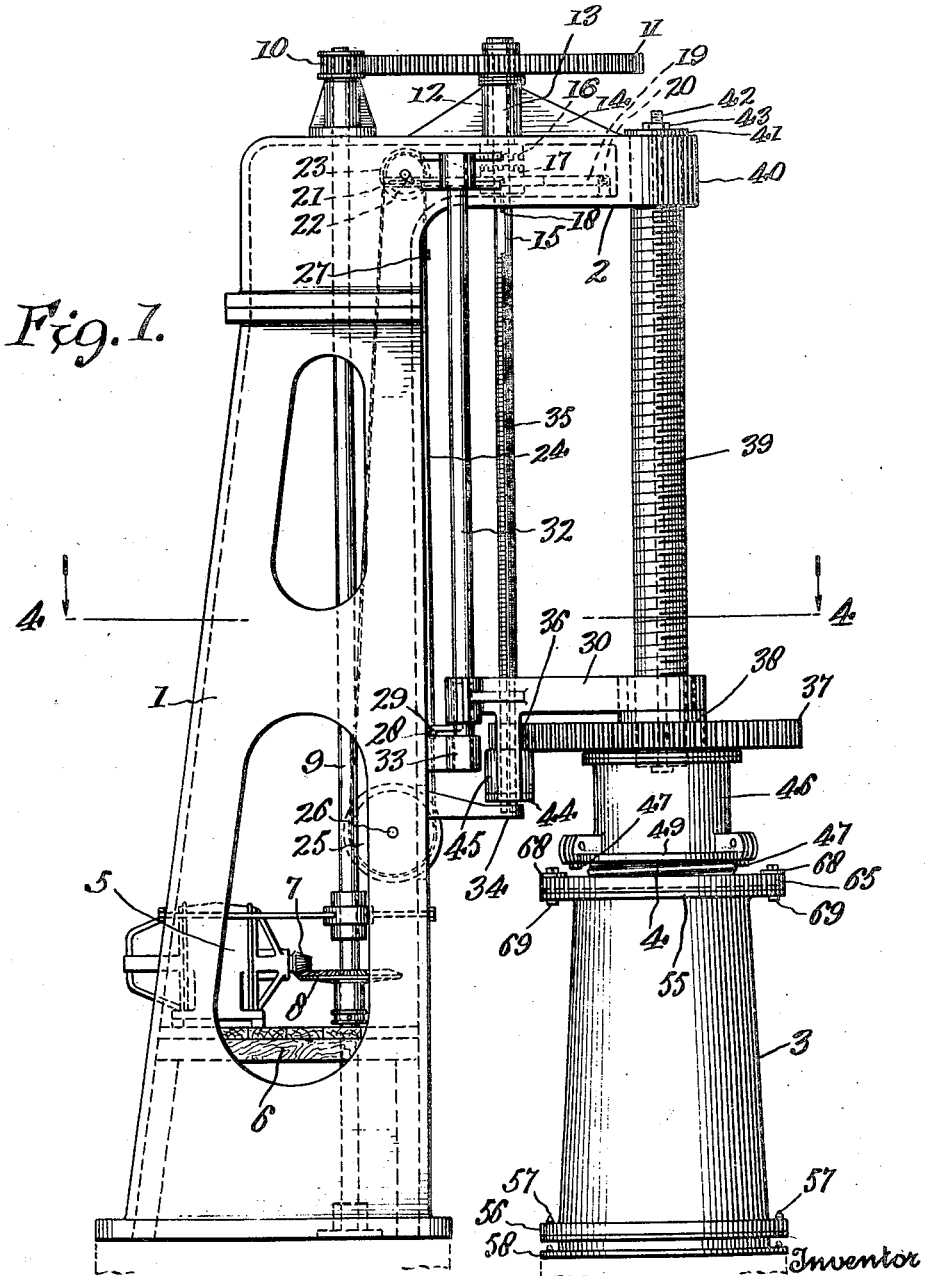

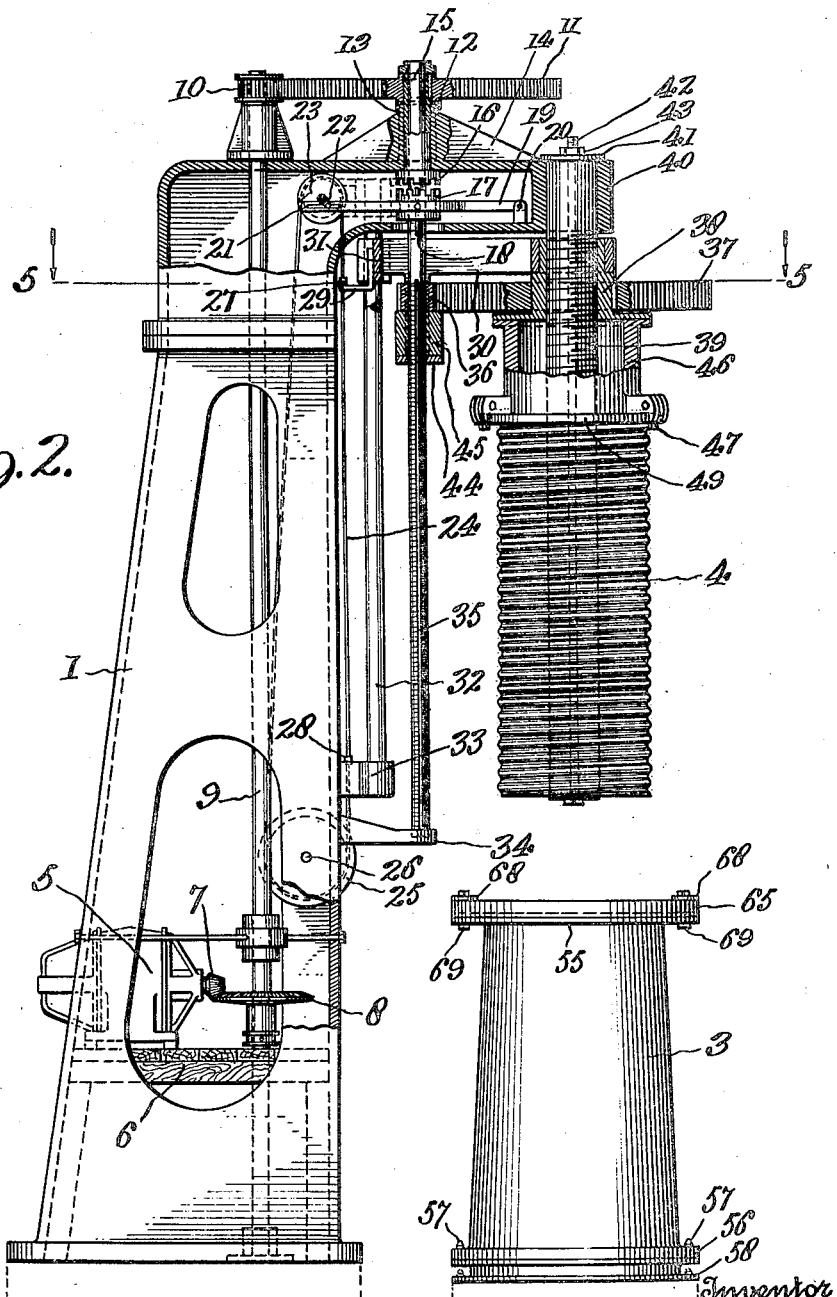

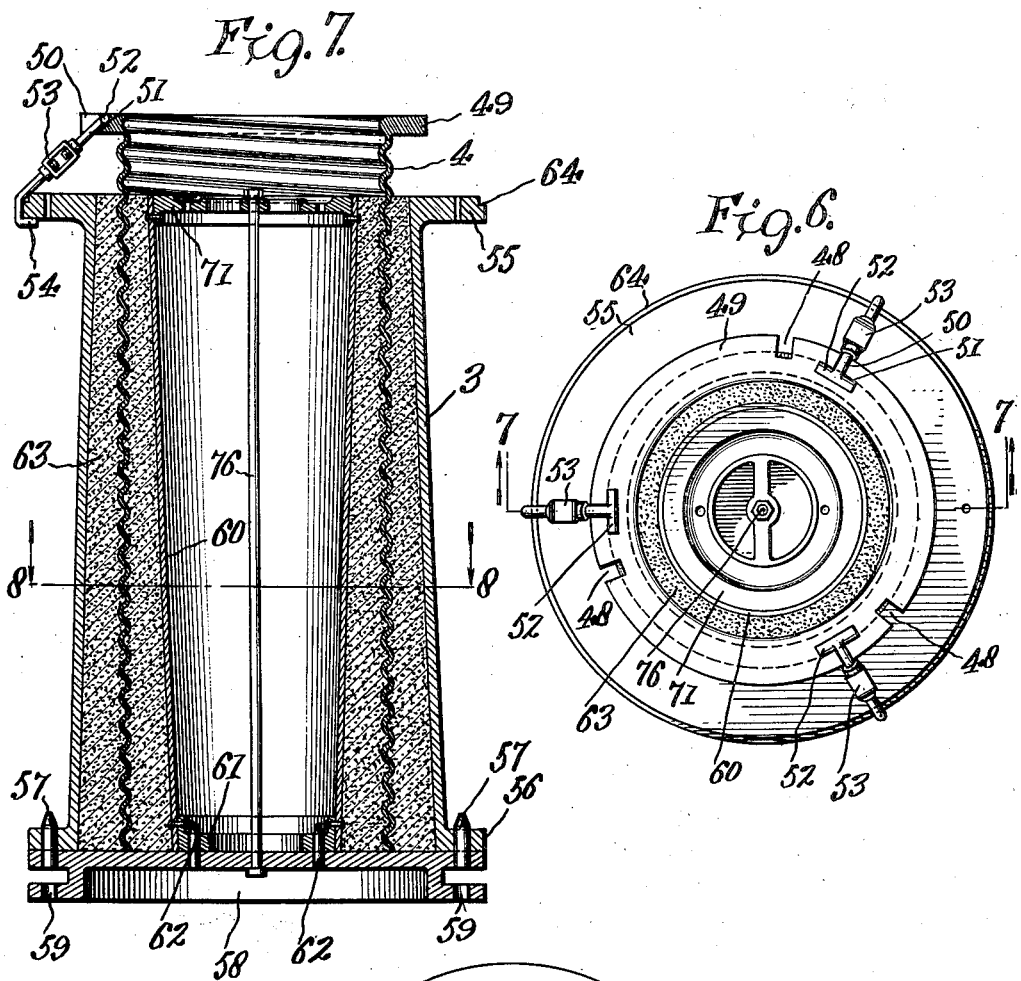
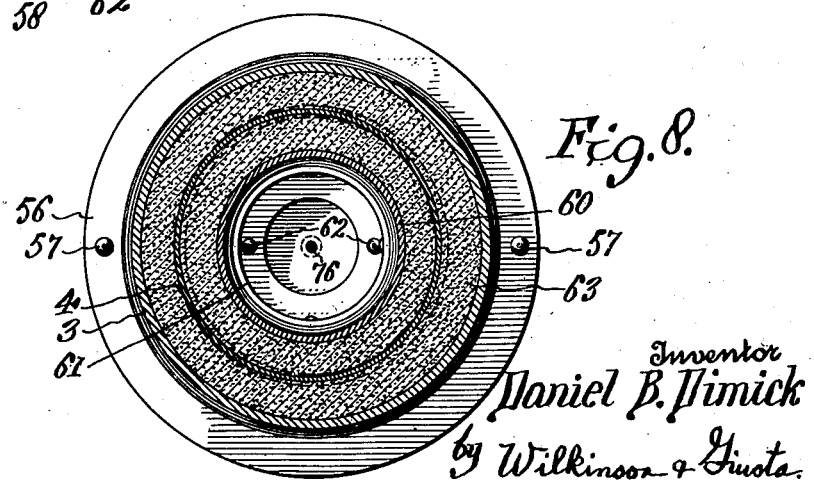

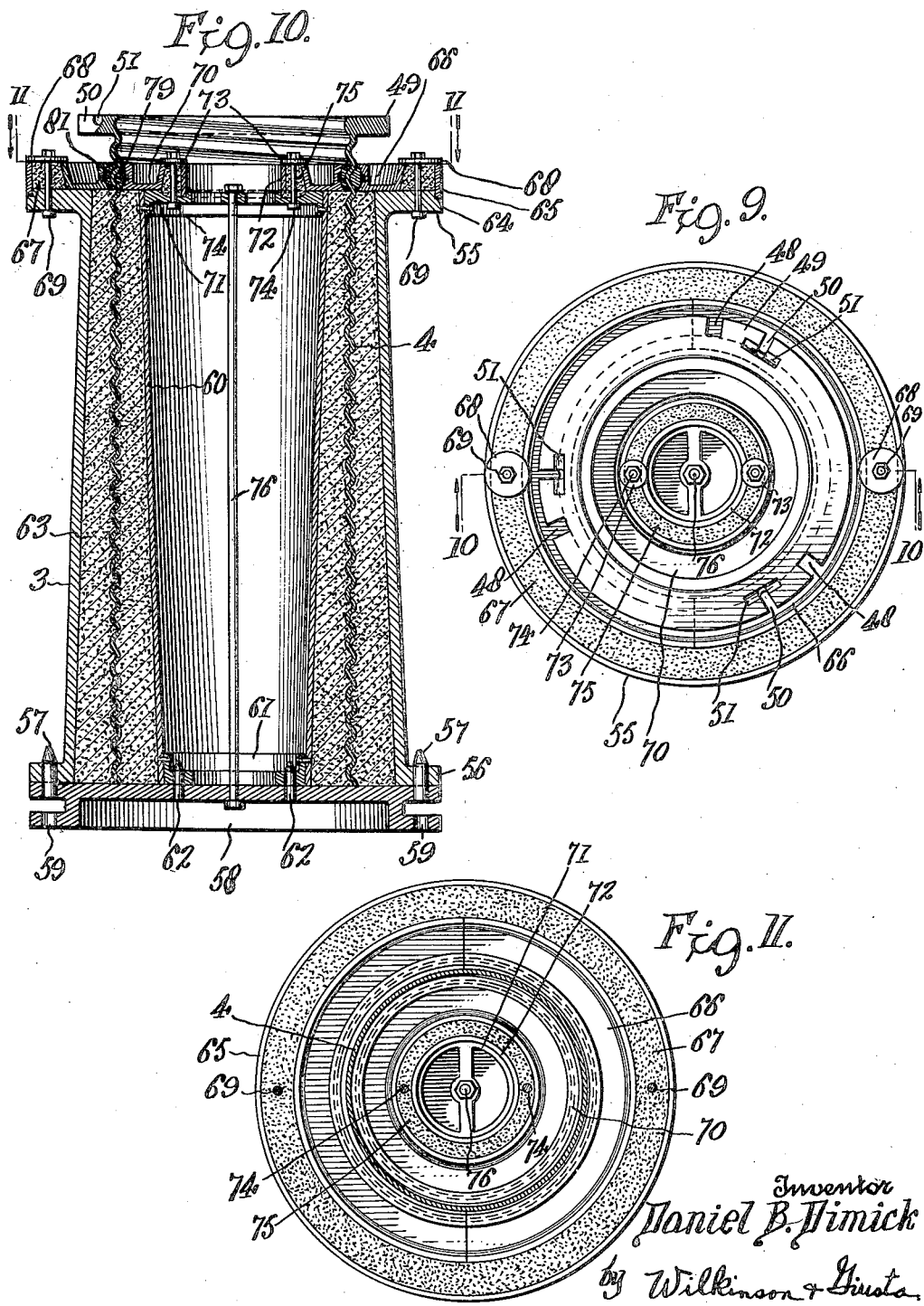

June 30, 1925. 1,544,056
D. B. DIMICK
APPARATUS FOR MOLDING PIPE
Filed Sept. 16, 1922 7 Sheets-Sheet 6
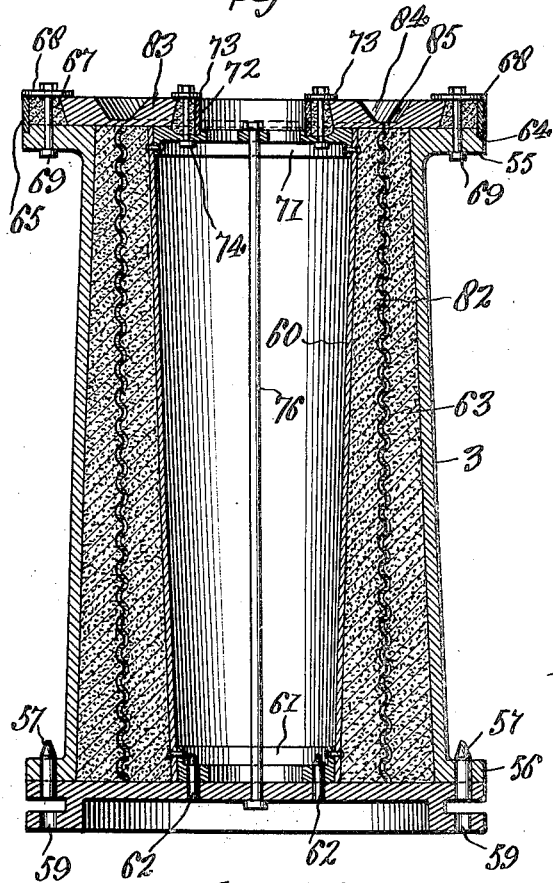
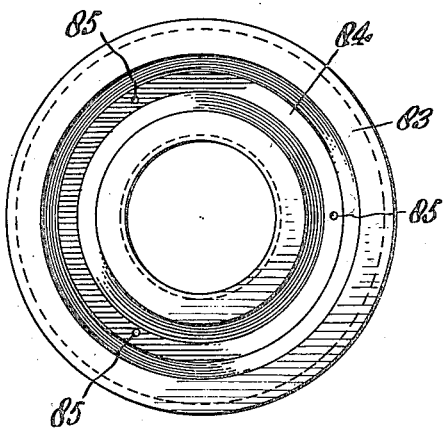
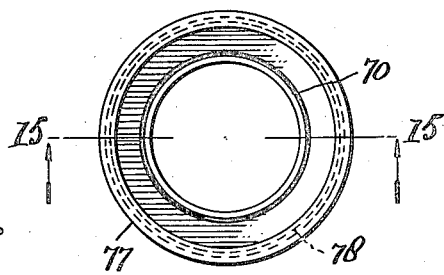
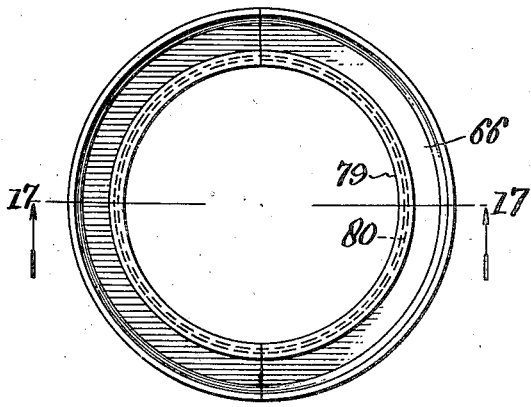
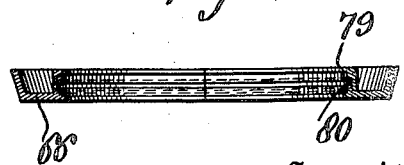
Inventor
Daniel B. Dimick
by Wilkinson & Giusta
Attorneys.

June 30, 1925.

D. B. DIMICK

APPARATUS FOR MOLDING PIPE

Filed Sept. 16, 1922

Inventor
Daniel B. Dimick
by Wilkinson & Fisota
Attorneys.

Patented June 30, 1925.

1,544,056

UNITED STATES PATENT OFFICE.

DANIEL BAKER DIMICK, OF BIRMINGHAM, ALABAMA.

APPARATUS FOR MOLDING PIPE.

Application filed September 16, 1922. Serial No. 588,649.

*To all whom it may concern:*

Be it known that I, DANIEL BAKER DIMICK, a citizen of the United States, residing at Birmingham, in the county of Jefferson and State of Alabama, have invented certain new and useful Improvements in Apparatus for Molding Pipe, of which the following is a specification.

The present invention relates to improvements in methods of apparatus for casting pipe in which the article produced is a relatively thin seamless metallic cast pipe possessing all of the commercial advantages of corrugated sheet metal pipe but costing only a small fraction of the expense entailed in the manufacture of the sheet metal product.

The article produced by the present improved method is more particularly described and claimed in my co-pending application filed of even date herewith, Serial Number 588,650.

It is an object of the present invention to produce a compact, efficient and reliable machine for accomplishing in a commercial way corrugated cast metal pipe wherein the article may be cheaply produced in large quantities and with a minimum of labor.

Other objects of the invention consists in improving the mold, the pattern and the method of applying and removing the pattern and in conducting the other steps and processes of the method by which the corrugated cast iron pipe is secured.

The pipe is perfectly cast without bell or spigot ends or in other words is a plain, uniform corrugated cylinder which is joined together by an improved union also described and claimed in my co-pending application aforesaid.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an improved casting machine constructed according to the present invention.

Figure 2 is a similar view with parts shown in section and with a pattern in a raised position.

Figure 3 is a top plan view of the apparatus.

Figure 4 is a horizontal section taken on the line 4—4 in Figure 1.

Figure 5 is also a horizontal section taken on the line 5—5 in Figure 2.

Figure 6 is a plan view of the mold showing the pattern therein.

Figure 7 is a vertical section taken on the line 7—7 in Figure 6.

Figure 8 is a cross section taken on the line 8—8 in Figure 7.

Figure 9 is another plan view of the mold showing the pattern still in place and with the stripping appliance.

Figure 10 is a vertical section taken on the line 10—10 in Figure 9.

Figure 11 is a transverse section taken on the line 11—11 in Figure 10.

Figure 12 is a vertical section through the mold after the pattern has been removed and the pouring core has been placed thereon.

Figure 13 is a plan view of the same.

Figure 14 is a plan view of the internal stripping ring.

Figure 15 shows a section taken diametrically therethrough on the line 15—15 in Figure 14.

Figure 16 is a plan view of the outer stripping ring.

Figure 17 is a central section taken on the line 17—17 in Figure 16.

Figure 18:
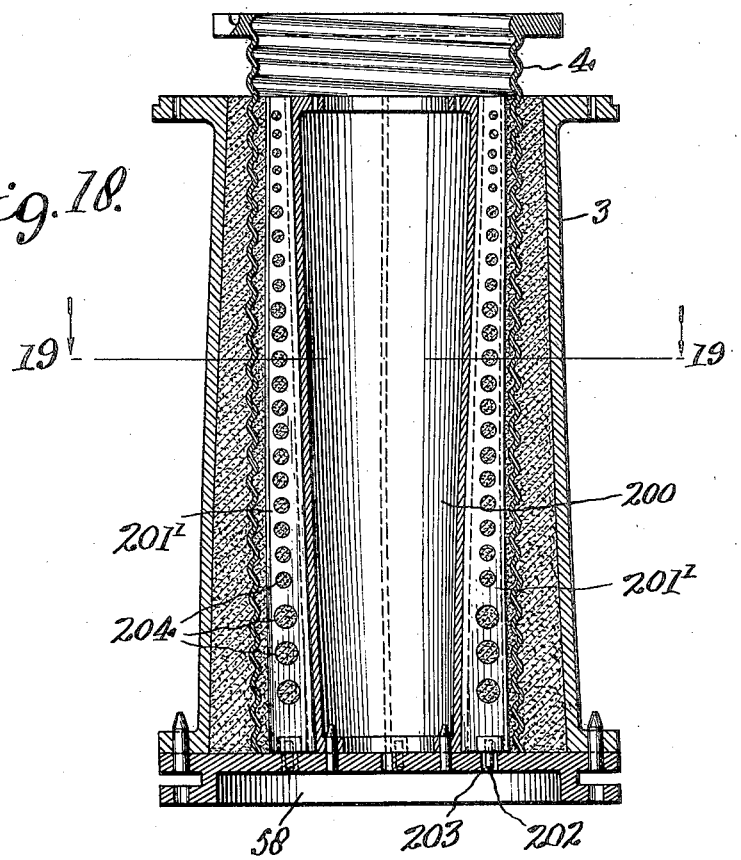
Figure 18 shows a vertical section through a modified form of mold.

Referring more particularly to the drawings 1 designates the frame work of the machine which is mounted upon a suitable bed or foundation and carries a head 2 over-hanging the mold, the outer jacket or cope of which is indicated at 3. The mold also has an adequate support to enable it to be held beneath the overhanging head 2 of the machine, during the operation of preparing the mold for the casting operation.

The pattern is represented at 4 and is a spirally corrugated cylinder adapted to enter the mold as shown in Figure 7 and to be lifted from the sand, after it has imposed the necessary formation thereon, by unscrewing the pattern and lifting it out as indicated in Figure 2. The source of power from which this lifting movement is secured may be the electric motor 5 installed upon a platform 6 within the frame 1 and having a driven bevel pinion 7 in mesh with a horizontally disposed bevel gear wheel 8 made fast on the vertical shaft 9 which is appropriately journaled in a suitable number of bearings in the frame work or adjacent parts.

Upon the upper end of the shaft 9, which projects above the top of the frame is a pinion 10 meshing with a gear wheel 11 which is keyed to a sleeve 12 carried in a bearing 13 reinforced by the webs 14 of the frame and head. The sleeve 12 rotates freely about a shaft 15 extending down parallel with the drive shaft 15. A clutch head 16 is carried upon the lower end of the sleeve 12 and is adapted to engage with a complemental clutch collar 17 keyed slidingly on the shaft 15 as indicated at 18 and movable up and down by its connection with a lever 19 pivoted at 20 and having a slot 21 at its free end engaged slidingly by a crank pin 22 upon an upper sheave 23 which is located within the head of the machine and receives a belt or operating cord 24. The cord extends downwardly and about a lower sheave 25 turning about the center 26 carried also in suitable journals of the frame.

The belt or cord 24 is furnished with rings 27 and 28 or the like adapted to be encountered by a lug carried upon the vertically sliding frame 30. This frame is of A-construction as best seen in Figure 4 and it is also a skeleton frame having lateral arms 31 at its base adapted to slide upon the vertical guide bars 32 held by the brackets 33 in spaced relation to the inner side portion of the frame 1. The frame 1 also is supplied with a bracket 34 in which the lower end of the shaft 15 is stepped. The major portion of the shaft 15 is screw-threaded and is provided with a longitudinal key-way 35, in which the pinion 36 is slidably keyed as shown in Figure 5, being permitted thereby to slide up and down upon the shaft 15 but being compelled to rotate therewith. The pinion 36 meshes with a gear wheel 37 keyed to the sleeve 38 internally threaded and engaged with the threads upon the pattern shaft 39 which is also parallel with the shaft 15 and it is suspended from the head 2 in any suitable manner, for instance projecting up through a bearing 40 and having a plate 41 wider than the shaft and engaging upon the top of the head about the bearing, the plate 41 being held in place by a screw rod 42 and a nut 43 thereon. The sleeve 38 is reduced at its upper portion and is received in the A-frame 30. The A-frame also carries stirrups 44 at its side near its base extending downwardly and beneath a nut 45 journaled upon the threads of the shaft 15 directly beneath the pinion 36.

The sleeve 38 is preferably flanged at its lower end to receive the head 46 which is flanged at the top and which carries the pattern 4. These flanges are bolted together.

Now the head 46 carries hinged bolts 47 at its lower end adapted to swing into the radial open slots 48 produced in the flange 49 on the top of the pattern as shown in Figure 6. The pattern is thus removably supported from the head and is lowered into the mold 3 when the A-frame descends, and is turned upwardly out of the sand when the A-frame is lifted.

The flange 49 of the pattern is also provided with slots 50 in suitable numbers having cross sockets 51 adapted to receive the T heads 52 upon turn-buckles 53 which have catches 54 on their opposite ends adapted to take beneath the flange 55 of the outer mold shell or cope 3.

The base of the outer jacket 3 is provided with an out-turned flange 56 perforated to receive the pins 57 projecting up from the casting stool 58. The pins provide for centering the cope upon the casting stool and the casting stool is also preferably provided with a bottom perforated flange 59 to receive pins projecting up from the jolter table to properly locate this stool and the mold thereon and to restrain any lateral movement of the casting stool on the jolter table while the mold is being jolt-rammed by the action for instance of a pneumatic jolter. The core or arbor 60 is in the form of a thin frusto-conical shell 60 having a bottom head 61 secured thereto as by riveting and provided with a ring flange perforated to receive the positioning pins 62 on the casting stool 58. The arbor is thereby caused to assume a proper relation with respect to the cope. These pins 62 also avoid any tendency of the arbor to rotate when the pattern is screwed out of the finished mold.

It is seen that the cope 3 is also of frusto-conical form being narrower at its top in order to economize in the use of the sand, which is indicated at 63 and fills up the space between the arbor 60 and cope 3. The sand 63 after being properly treated with sea coal and facing in accordance with the usual foundry custom is filled in at opposite sides of the pattern 4 and assumes the spirally corrugated form of the pattern.

It will be noted that the flange 55 of the cope 3 is provided with a shoulder 64 to receive the ring 65 shown in Figure 10. This ring 65 co-operates with an annular channel ring 66 forming an outer strip ring, the outer flange of which is spaced from the outer ring 65 in order to provide a space for sand as indicated at 67 which is confined by the annular top plate 68 forming with the bolts 69 a clamp to hold the two rings in place. The external stripping ring 66 lies upon the outside of the pattern while an internal stripping ring 70 extends within the pattern and is supported by the upper head 71 of the arbor. The inner stripping ring also cooperates with an internal annulus 72 fitting in the shoulder depression of the top arbor head 71, this annulus and the inner stripping ring being held in place and suitably apart by the annular plate 73 and the clamp bolts 74, sand being made to occupy the space 75. The sand is hand-rammed into the space 67 and 75 and the top heads 71 of the arbor is held to the casting stool as by a central bolt 76.

The stripping rings are shown more particularly in Figures 14 to 17 inclusive and they each consist of skeleton plates. The internal ring is continuous in one piece while the outer ring is separable into two parts in order that it may be placed about the pattern. The inner ring is provided with a cavity 77 on its outer peripheral edges having a dove-tail socket 78 in which the babbitt is directly cast. In a similar way the inner flange of the outer stripping ring is provided with a cavity 79 and a dove-tail socket 80 to receive the external babbitt 81. The dove-tail slots provide for anchoring the babbitt securely in position and the mutually adjacent facing of the babbitt are spirally threaded in accordance with the pitch of the pattern in order that the pattern may be screwed forwardly therethrough.

Referring more particularly to Figures 12 and 13, the pattern is shown as having been removed leaving the mold cavity 82 into which the molten metal for forming the pipe is flowed through a top pouring core 83 which is of channel construction in order to receive the molten metal in the trough 84 and to permit it to pass through the openings 85 into the mold cavity. The pouring core is put in place after the stripping rings are removed and is located by the core prints 67 and 75.

In the operation of the machine the pattern 4 is first placed in the mold 3 while the mold occupies a position upon the table of the jolt-ramming machine and suitably treated sand is poured into the spaces at opposite sides of the core, the sand being replenished from time to time as the operation of jolt-ramming proceeds. During this time the pattern is held securely in place by use of the turn-buckles or clamps 53. After this operation has been concluded the clamps are removed and stripping rings 66 and 70 are applied to the top of the mold or in other words the mold is put in the conditions shown in Figure 10. Head 46 is disengaged from pattern flange and run up while jolting takes place. The A-frame 30 is lowered to permit the bolts 47 of the head 46 to engage in the slots 48 of the pattern rim 49. It will be understood that the shafts 39 is chased with a thread the pitch of which agrees with that of the corrugations in the pattern 4 while the threads upon the shaft 15 are only approximately one-third the aforesaid pitch or otherwise graduated with reference to the pitch upon the shaft 39 to agree with the ratio between the pinion 36 and the gear wheel 37. The relative arrangement of these various parts is such as to cause both the pinion and gear wheel to ascend with the A-frame 30.

Therefore after the pattern is suitably coupled to the apparatus the motor 5 is set in operation and through the pinion 7 and the gear wheel 8 rotation is permitted to the vertical shaft 9 and through the pinion 10 to the gear wheel 11, sleeve 12 and the upper clutch head 16. Now these parts may be left running constantly for it is only when the clutch is engaged that any movement will be communicated to the A-frame and to the pattern. The operator, for instance occupying the platform 6 opposite the motor is in a position to pull upon the cord 24 and thus rotate the sheave 23 causing the crank pin 22 to turn in the slot 21 and to raise the lever 19. The clutch collar 17 is thus elevated into engagement with the clutch head 16 whereby the movement of the gear wheel 11 is transmitted to the screw shaft 15. The stationary nut 45 carried by the A-frame 30 will thus be caused to travel up or down in accordance with the direction of movement of the shaft 15 and in order to secure movement in both directions the electric motor 5 is of the reversible type, and has variable speed control box.

Assume that the parts are in the position shown in Figure 1 and the rotation of the shaft 15 is in a direction to raise the nut 45, then a corresponding movement will be communicated to the A-frame by which the nut is carried and to the pinion 36 and a gear wheel 37 which are lifted in unison due to the relative pitches of the shafts 15 and 39, and their relative speeds. The pattern 4 is thus raised and turned at the same time, screwing it out of the Babbitt rings 79 and 81 which strips any sand attempting to cling to the pattern and the stripping rings avoid any dislocation or tendency of the top portion of the sand to be lifted out with the movement of the pattern.

When the pattern is wholly removed from the mold and when it substantially reaches the upper limit of its travel, the projection 29 is timed to strike the upper collar 27 on the operating cord 24 in order that the cord and the upper sheave 23 may receive a sufficient movement to cause disengagement of the clutch. On the descending movement the projection 29 strikes the lower collar 28 and shifts the sheave also to disengage the clutch so that the stopping of the machine is automatic.

Now having removed the pattern, it remains to place the pouring core 83 upon the top of the mold or in other words to place the mold in the condition shown in Figure 12. For this purpose the stripping rings are of course removed and the sand prints 67 and 75 as aforesaid indicate where to place the core 83 in order that the openings 85 may register accurately with the cylindrical corrugated cavity 82. The clamp plates 68 and 73 are useful in holding the pouring core in position. The hot molten metal or cast iron is poured into the trough 84 and descending through the openings 85 is molded in the cavity 82 into a spirally corrugated relatively thin walled cast pipe having plain ends and imitating corrugated sheet metal pipe both in appearance, strength and durability. After pouring and while the pipe is still white hot and set the pouring core is stripped off, bolt 76 released and over head cranes hook on to and pull the entire core arbor 60 out of the mold the pipe thus shrinks in cooling without meeting resistance, and prevents interval stress being set up in its wall structure. The mold is dismantled after the molded pipe has set and the parts are then in position to repeat the operation.

The arrangement and disposition of the screw shafts 15 and 39 in combination with the driving gears develop a relatively great lifting power upon the pattern 4, while the action is accurate and relatively quick to the end that the machine may have a large capacity and be able to produce the pipes in large quantities.

Figure 19:
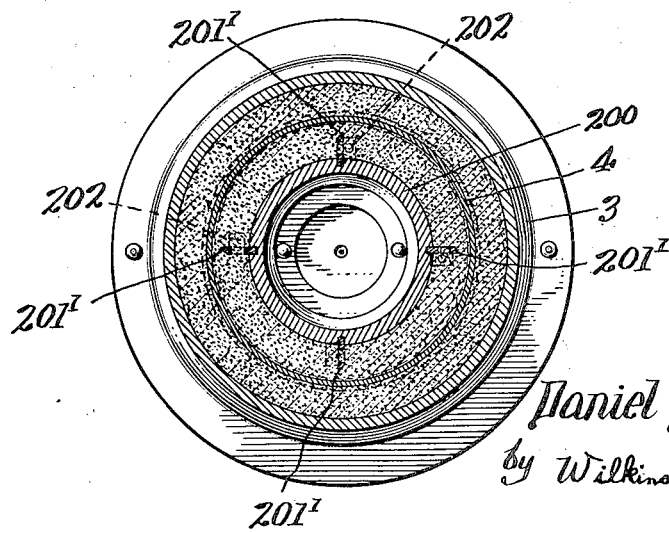
Figure 19 is a horizontal section taken on the line 19—19 in Figure 18.

Referring more particularly to Figures 18 and 19, the jacket and stool are the same as shown in prior figures as is also the pattern, but the arbor 200 is made of an inverted frusto conical shape and provided with slots 201 in its outer wall, these slots being shown as four in number and spaced at 90 degrees about the arbor. In these slots engage wings 201', which are lost therein and project out to within substantially one-half inch of the core. At their bases these wings carry pins 202 which engage in elongated slots 203 in the stool. The wings are also made with transverse perforations 204 therein in order to receive the sand to bind the wings in position and prevent the withdrawal thereof with the core.

The wings being put in position, the sand is rammed or jolted around through the initial space through the pattern and the arbor. When screwing the spiral corrugated pattern out of the mold a sheering of the sand about the arbor is apt to take place but the presence of the wings avoids this.

Pins 202 normally rest in the outer ends of the slots 203 which permits the wings to creep inwardly when the core 204 is withdrawn. The mold is made and the pipe poured after withdrawal of the core in a manner already described. Just after pouring, overhead cranes are arranged to pull the arbor 204 upwardly, leaving the four wings in the mold. As the casting shrinks in cooling and goes in, the wings are forced before it, the slots 203 allowing of this movement. There is therefore not set up in the walls of the pipe any internal stress by meeting resistance.

It is obvious that various changes and modifications may be made in the details of construction and design of the above specifically described embodiment of this invention without departing from the spirit thereof, such changes and modifications being restricted only by the scope of the following claims.

What is claimed is:

1. An apparatus for molding pipe comprising a pattern having a continuously cylindrical wall spirally corrugated both externally and internally, a mold adapted to receive said pattern and to hold sand against both exterior and interior corrugated walls, and means for simultaneously rotating and moving said pattern axially whereby to withdraw it from the mold without disturbing either spirally corrugated wall of the sand cavity.

2. An apparatus for molding pipe comprising a mold, a pattern having a spiral wall extending to both interior and exterior faces thereof adapted to be received into said mold and to receive the sand against both interior and exterior faces thereof, a master screw having the same pitch as said pattern supported externally of the mold, and rotating means traveling on said master screw and coupled to said pattern for simultaneously turning and withdrawing the pattern axially from the mold.

3. An apparatus for casting pipe comprising a frame work having a head adapted to over-hang a mold, a source of power carried by the frame work, means carried by the over-hanging head for engaging with the pattern in the mold, and releasable connections between the source of power and said means for raising and simultaneously turning the pattern out of the mold, substantially as described.

4. An apparatus for casting pipe comprising a frame work having a head adapted to overhang the mold, means adapted to travel up and down beneath said head and detachably arranged with the spirally threaded pattern in the mold, a driven screw shaft carried by the head and having threaded engagement with said means whereby to raise and lower the pattern, and means associated with said shaft for causing rotation of the pattern, substantially as described.

5. An apparatus for casting pipe comprising a frame work having a head adapted to over-hang the mold, a screw shaft carried by the head, means having threaded engagement with said screw shaft and moving up and down thereon, said means adapted to be attached to a spirally threaded pattern in the mold, a source of power carried by the frame work, releasable connections between said source of power and said means whereby to impart rotation to the means and to the pattern, substantially as described.

6. An apparatus for casting pipe comprising a frame work having a head over-hanging the mold, a screw shaft suspended by the head axially of the mold, a second screw shaft mounted parallel with the first mentioned shaft, means carried by the frame work for turning said second screw shaft, a frame movable up and down upon said shafts by the turning of said second shaft, a gear means rotating about said shafts and in mesh with one another, and means connected to the spirally threaded pattern in the mold and turning with said gear means, said last named means also moved up and down upon the first mentioned threaded shaft, substantially as described.

7. An apparatus for casting pipe comprising a frame work having a head over-hanging the mold, a pair of threaded shafts extending down from said head, one of said shafts being substantially axial of the mold and having a thread of approximately three times the pitch of the companion threaded shaft, a frame moving up and down upon and guided by said threaded shafts and being moved up and down directly by the rotation of the finer threaded shaft, said frame having no connection with the threads of the coarser shaft, a pinion rotated by the said finer threaded shaft, a gear wheel in mesh with said pinion and in engagement with the threads of the coarser shaft, means carried by the frame work for driving said finer threaded shaft, and a head fixed to rotate and travel up and down with said gear wheel and having means to engage with the pattern in the mold, substantially as described.

8. An apparatus for casting pipe comprising a frame work having a head over-hanging the mold, a motor carried by the frame work, a shaft driven by the motor, a second shaft having relatively fine threads depending from the head, a clutch interposed between the two shafts a frame moving up and down with the threaded shaft and having means engaged with the threads for causing such traveling movement, clutch-throwing means adapted to be operated to disengage the clutch when the frame reaches the upper or lower limit of its movement, and means elevated with said frame and having a rotary movement derived from the movement of said screw shaft for raising and lowering the pattern in the mold, substantially as described.

9. An apparatus for casting pipe comprising a frame work having a head over-hanging the mold, a motor carried by said frame work, a shaft rotated by said motor, a second shaft having relatively fine screw threads depending from said head, a gear-wheel rotatable independently of said screw shaft and driven from said first mentioned shaft, a clutch head turning with said gear wheel, a clutch companion element splined to said screw shaft a lever for moving said clutch element into engagement with the clutch head, an operating endless cord adapted to shift said lever and frame moving up and down with the screw shaft having means to shift said cord at the upper and lower elements of its movement, a second screw shaft having coarser threads, and means moving up and down upon said coarser threaded shaft and rotated from said finer threaded shaft and having engagement with the pattern of the mold, substantially as described.

DANIEL BAKER DIMICK.